(12) United States Patent
Tubert

(10) Patent No.: US 9,148,604 B2
(45) Date of Patent: Sep. 29, 2015

(54) PIXEL READ METHOD

(71) Applicant: STMicroelectronics (Grenoble 2) SAS, Grenoble (FR)

(72) Inventor: Cedric Tubert, Sassenage (FR)

(73) Assignee: STMicroelectronics (Grenoble 2) SAS, Grenoble (FR)

(*) Notice: Subject to any disclaimer, the term of this patent is extended or adjusted under 35 U.S.C. 154(b) by 211 days.

(21) Appl. No.: 14/045,516

(22) Filed: Oct. 3, 2013

(65) Prior Publication Data

US 2014/0103197 A1    Apr. 17, 2014

(30) Foreign Application Priority Data

Oct. 12, 2012 (FR) ...................... 12 59736

(51) Int. Cl.
  H04N 5/355 (2011.01)
  H04N 5/378 (2011.01)
  H04N 5/374 (2011.01)

(52) U.S. Cl.
  CPC .............. *H04N 5/378* (2013.01); *H04N 5/355* (2013.01); *H04N 5/35581* (2013.01); *H04N 5/374* (2013.01)

(58) Field of Classification Search
  CPC  H04N 5/355; H04N 5/35536; H04N 5/35572
  USPC ........ 250/208.1, 214 R, 214 P; 348/294, 295, 348/297, 302, 303, 308
  See application file for complete search history.

(56) References Cited

U.S. PATENT DOCUMENTS

| 7,586,523 B2* | 9/2009 | Egawa et al. ............. 348/229.1 |
| 2007/0097240 A1 | 5/2007 | Egawa et al. |
| 2008/0158398 A1* | 7/2008 | Yaffe et al. .................... 348/294 |
| 2011/0221944 A1 | 9/2011 | Deschamps |
| 2014/0002705 A1* | 1/2014 | Deschamps .................. 348/308 |

FOREIGN PATENT DOCUMENTS

JP    2001346096 A    12/2001

OTHER PUBLICATIONS

Park et al., "A 142dB Dynamic Range CMOS Image Sensor with Multiple Exposure Time Signals", Asian Solid-State Circuits Conference, 2005, IEEE, PI, Nov. 1, 2005, pp. 85-88, XP031019750.
Solhusvik et al., "A 1280x960 3.75um pixel CMOS imager with Triple Exposure HDR," in Proc. Of 2009 International Image Sensor Workshop, Bergen, Norway, Jun. 22-28, 2009, 4 pages.

* cited by examiner

*Primary Examiner* — Kevin Pyo
(74) *Attorney, Agent, or Firm* — Seed IP Law Group PLLC

(57) ABSTRACT

A method for reading a pixel, including at least two integration periods, at least one of said periods including at least one integration sub-period, wherein an output value of the pixel is determined by taking into account the amounts of photogenerated charges contained in the pixel at the end of each of said periods and the amount of photogenerated charges stored in a photodiode of the pixel beyond a threshold during said at least one sub-period.

20 Claims, 3 Drawing Sheets

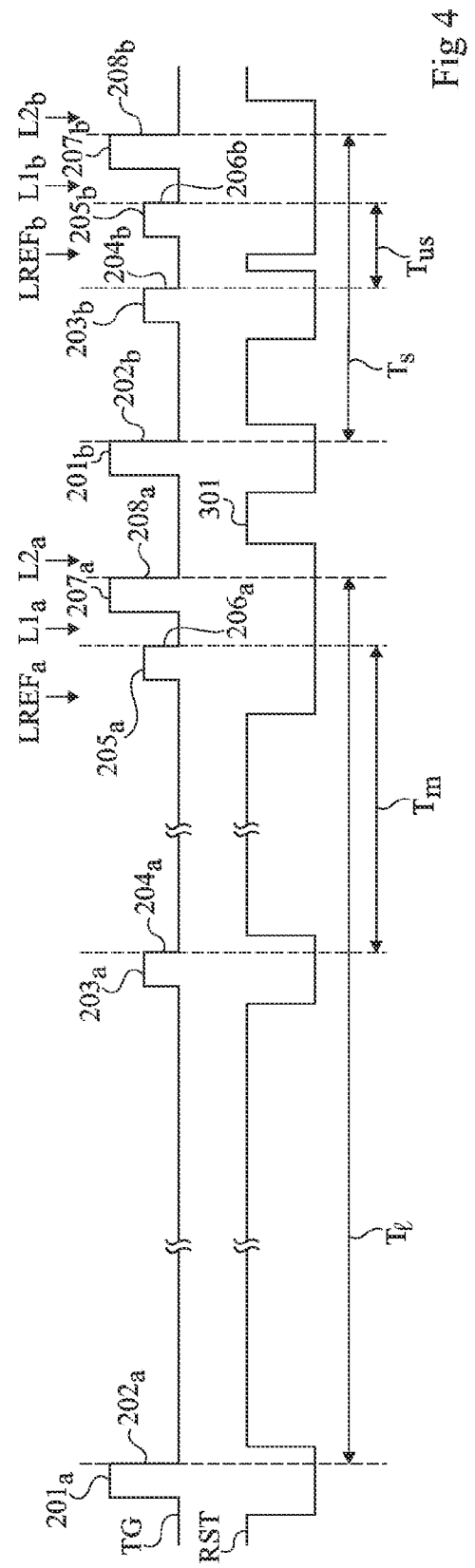

PIXEL READ METHOD

BACKGROUND

1. Technical Field

The present disclosure relates to image sensors, for example a CMOS sensor such as a high-dynamic sensor, and to a method for reading or controlling the pixels of such a sensor.

2. Description of the Related Art

Conventionally, a CMOS image sensor comprises pixels arranged in rows and in columns. Each pixel essentially comprises a photodiode used in reverse mode, having its junction capacitance discharged by a photocurrent according to a received light intensity, and a circuit for reading the pixel. The measurement of the illumination level received by a pixel is performed by measurement of the voltage across the photodiode at selected times, including the end of a period, called image acquisition or integration period, before and after which the pixel is reset by recharging of its photodiode. The decrease of the voltage across the photodiode during the integration is proportional to the received light intensity. The sensor also comprises a circuit for controlling the read circuit of each pixel, which especially controls the shutting, and a circuit for processing the pixel signal provided by the read circuit of each pixel.

For high light intensities, the photocurrent may be such that the discharge of the junction capacitance during the integration phase adversely affects the measurement. In particular, beyond a given light intensity threshold, which especially depends on the integration time and on the features of the pixel elements, the photodiode reaches, before the end of the integration time, a so-called saturation discharge level, and brightness differences are no longer discriminated.

To improve the sensitivity dynamics of a sensor, that it, the illumination range that a pixel of the sensor is capable of discriminating, it has been provided, in French patent application 2957475 and in patent U.S. Pat. No. 7,586,523, to implement control methods having a double integration period, that is, where the integration period comprises an integration sub-period. The pixel output value is then determined by taking into account the amount of photogenerated charges contained in the pixel at the end of the integration period, and the amount of photogenerated charges stored in the photodiode above a threshold during the integration sub-period.

BRIEF SUMMARY

An embodiment facilitates improving the sensitivity dynamics of a CMOS image sensor.

An embodiment facilitates reducing the amount of memory necessary to process the pixel signals of a CMOS image sensor.

An embodiment provides a method for reading a pixel, comprising at least two integration periods, at least one of the integration periods comprising at least one integration sub-period, wherein an output value of the pixel is determined by taking into account the amounts of photogenerated charges contained in the pixel at the end of each of the integration periods, and the amount of photogenerated charges stored in a photodiode of the pixel beyond a threshold during the sub-period.

According to an embodiment, before the end of the integration sub-period, the photogenerated charges stored in the photodiode beyond the threshold are drained off from the photodiode.

According to an embodiment, each of the integration periods comprises at least one integration sub-period.

According to an embodiment, at least one of the integration periods comprises no integration sub-period.

According to an embodiment, at the end of each integration period, an intermediate output value of the pixel is determined, the pixel output value being determined by taking into account the intermediate values.

According to an embodiment, at the end of each integration period comprising an integration sub-period, the intermediate value is determined by taking into account the amount of photogenerated charges contained in the pixel at the end of the integration period, and the amount of photogenerated charges stored in the photodiode beyond a threshold during the integration sub-period.

According to an embodiment, the method comprises two integration periods.

According to an embodiment, the integration periods and sub-periods all have different durations.

Another embodiment provides an image sensor comprising at least one pixel having at least one photodiode and one read circuit, and a circuit capable of controlling the above pixel.

According to an embodiment, each circuit for reading a pixel comprises a transistor connecting the cathode of the photodiode of the pixel to a sense node of the pixel.

A method for reading a pixel may comprise at least two integration periods, at least one of said periods comprising at least one integration sub-period, wherein an output value of the pixel is determined by taking into account the amounts of photogenerated charges contained in the pixel at the end of each of said periods, and the amount of photogenerated charges stored in a photodiode of the pixel beyond a threshold during said at least one sub-period. A method may comprise, before the beginning of said at least one integration sub-period, the photogenerated charges stored in the photodiode beyond said threshold are drained off from the photodiode. Each of said integration periods may comprise at least one integration sub-period. At least one of said integration periods may comprise no integration sub-period. At the end of each integration period, an intermediate output value of the pixel may be determined, the output value of the pixel being determined by taking into account said intermediate values. At the end of each integration period comprising an integration sub-period, said intermediate value may be determined for example by taking into account the amount of photogenerated charges contained in the pixel at the end of the integration period and the amount of photogenerated charges stored in the photodiode beyond a threshold during the integration sub-period. A method may comprise two integration periods. The integration periods and sub-periods may all have different durations.

An image sensor may comprise: at least one pixel having at least one photodiode and one read circuit; and a circuit capable of controlling said at least one pixel. A circuit for reading a pixel may comprise a transistor connecting the cathode of the photodiode of the pixel to a sense node of the pixel.

A method may comprise: determining an amount of photogenerated charges in a pixel at an end of a first integration period; determining an amount of photogenerated charges in the pixel at an end of a second integration period; determining an amount of photocharges in the pixel beyond a threshold at an end of an integration subperiod; and determining an output associated with the pixel based on the determined amount of photogenerated charges in the pixel at the end of the first integration period, the determined amount of photogenerated charges in the pixel at the end of the second integration period and the determined amount of photocharges in the pixel beyond the threshold at the end of the integration subperiod. A method may comprise, before the beginning of said integration sub-period, draining photogenerated charges stored in the photodiode beyond said threshold from the photodiode. Each integration period may comprise at least one integration sub-period and the output associated with the pixel may be based on the determined amount of photocharges in the pixel beyond a threshold at the end of each of the integration subperiods. At least one of said integration periods may not have an integration sub-period. The method may comprise: determining an intermediate output value of the pixel at the end of each integration period, wherein the output associated with the pixel is based on said intermediate values. The method may comprise, at the end of each integration period comprising an integration sub-period, determining said intermediate value based on the amount of photogenerated charges contained in the pixel at the end of the integration period and the amount of photogenerated charges stored in the photodiode beyond a threshold during the integration sub-period. The method may comprise: determining an amount of photogenerated charges in the pixel at an end of a third integration period, wherein the determined output associated with the pixel is based on the determined amount of photogenerated charges in the pixel at the end of the third integration period. Said integration periods and the sub-period may have different durations. The integration subperiod of the first integration period may have a longer duration that a duration of the second integration period.

A system may comprise: at least one pixel having a photodiode; and at least one processing device configured to: read an amount of photogenerated charges in a pixel at an end of a first integration period; read an amount of photogenerated charges in the pixel at an end of a second integration period; determine an amount of photocharges in the pixel beyond a threshold at an end of an integration subperiod; and determine an output associated with the pixel based on the amount of photogenerated charges in the pixel at the end of the first integration period, the amount of photogenerated charges in the pixel at the end of the second integration period and the amount of photocharges in the pixel beyond the threshold at the end of the integration subperiod. A pixel may include a read circuit having a transistor connecting a cathode of the photodiode of the pixel to a sense node of the pixel. The at least one processing devices may be configured to cause the pixel to drain photogenerated charges stored in the photodiode beyond said threshold from the photodiode. Each of said integration periods may comprise at least one integration sub-period. The at least one processing device may be configured to determine an intermediate output value of the pixel at the end of each integration period, wherein the output associated with the pixel is based on said intermediate output value. The at least one processing device may be configured to, at the end of each integration period comprising an integration sub-period, determine said intermediate value based on the amount of photogenerated charges contained in the pixel at the end of the integration period and the amount of photogenerated charges stored in the photodiode beyond a threshold during the integration sub-period. Said integration periods and the sub-period may have different durations. The at least one pixel may comprise a plurality of pixels of an image sensor.

A non-transitory computer-readable medium may contain contents which cause at least one processing device to perform a method, the method comprising: determining an amount of photogenerated charges in a pixel at an end of a first integration period; determining an amount of photogenerated charges in the pixel at an end of a second integration period; determining an amount of photocharges in the pixel beyond a threshold at an end of an integration subperiod; and determining an output associated with the pixel based on the determined amount of photogenerated charges in the pixel at the end of the first integration period, the determined amount of photogenerated charges in the pixel at the end of the second integration period and the determined amount of photocharges in the pixel beyond the threshold at the end of the integration subperiod. The method may comprise: before the beginning of said integration sub-period, draining photogenerated charges stored in the photodiode beyond said threshold from the photodiode. Said integration periods and the sub-period may have different durations.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

FIG. 4 is a timing diagram illustrating the variation of signals for controlling the pixel of FIG. 1 according to an embodiment of a control method.

DETAILED DESCRIPTION

Figure 1:
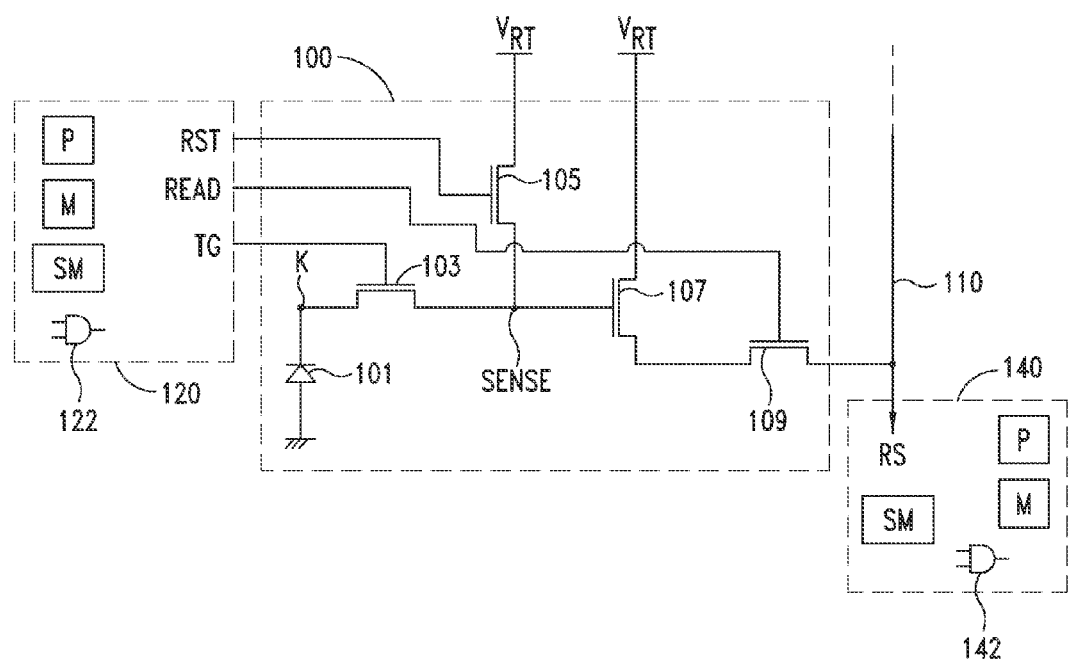
FIG. 1 schematically shows an example of a CMOS image sensor and of a pixel of this sensor.

In the following description, numerous specific details are given to provide a thorough understanding of embodiments. The embodiments can be practiced without one or more of the specific details, or with other methods, components, materials, etc. In other instances, well-known structures, materials, or operations, such as, for example, transistors, photodiodes, processors, controllers, power supplies, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

For clarity, the same elements have been designated with the same reference numerals in the different drawings unless the context indicates otherwise, and, further, the various drawings are not to scale.

FIG. 1 schematically shows a CMOS-type image sensor. The sensor conventionally comprises a large number of identical pixels arranged in rows and in columns. For clarity, FIG. 1 shows a single pixel 100 of the sensor. The sensor of FIG. 1 also comprises a circuit 120 for controlling the read circuit of each pixel, and a circuit 140 for processing the pixel signal provided by the read circuit of each pixel. The circuit 120 may comprise one or more processors P, memories M, state machines SM and discrete circuitry 122, such as transistors, logic gates, etc., and various combinations thereof. The circuit 140 may comprise one or more processors P, memories M, state machines SM and discrete circuitry 142, such as transistors, logic gates, etc., and various combinations thereof. In some embodiments, the circuits 120, 140 may be implemented using a combined circuit.

Pixel 100 comprises a photodiode 101 and a read circuit with four MOS transistors 103, 105, 107, and 109. In the example, transistors 103, 105, 107, and 109 are N-channel transistors. The anode of photodiode 101 is grounded, and its cathode K, or acquisition node, is connected, via transistor 103 or transfer transistor, to a sense node SENSE. Sense node SENSE is connected, by a transistor 105 or reset transistor, to a high power supply rail $V_{RT}$. Node SENSE is further connected to the gate of transistor 107 assembled as a follower source. The drain of transistor 107 is connected to high power supply rail $V_{RT}$, and the source of transistor 107 is connected, via transistor 109 or read transistor, to an output rail 110 providing a pixel signal RS. In operation, the gate of transistor 103 of each of the pixels of a same pixel row receives a same transfer signal TG, the gate of transistor 105 of each of the pixels of a same pixel row receives a same reset signal RST, and the gate of transistor 109 of each of the pixels of a same pixel row receives a same row selection signal READ. The source of transistor 109 of each of the pixels of a same pixel column is connected to a same output rail 110.

FIGS. 2 and 3A to 3C illustrate the operation of an example of a control method with a double integration period, which has been provided to improve the sensitivity dynamics of a CMOS sensor of the type described in relation with FIG. 1.

Figure 2:
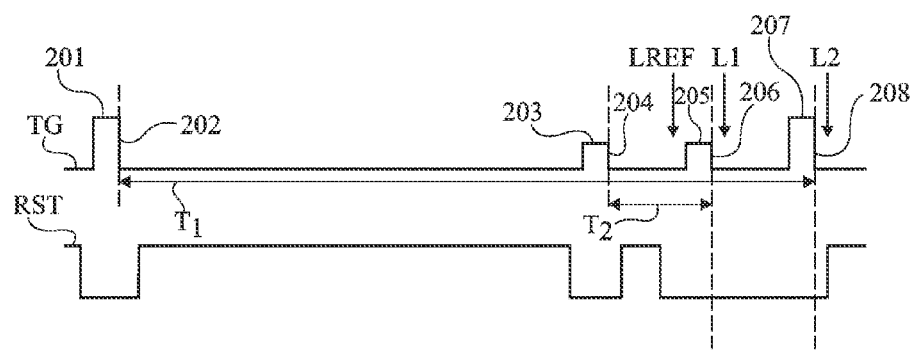
FIG. 2 is a timing diagram illustrating the variation of signals for controlling the pixel of FIG. 1 according to an example of control method with a double integration period.

FIG. 2 is a timing diagram illustrating the variation of control signals TG and RST applied to pixel 100 by control circuit 120 during a pixel read cycle.

Before the beginning of an integration phase, signal RST is set to a high state, which causes the resetting of sense node SENSE to high power supply voltage $V_{RT}$. Signal RST is then set back to a low state, after which transfer signal TG is set to a high voltage $V_{HTG}$, for example, equal to 2.8 V, during a first pulse 201, or photodiode initialization pulse. This causes the transfer of all charges stored in photodiodes 101 to sense node SENSE. The voltage across photodiode 101 then becomes equal to the natural voltage of the diode, which results from the doping levels, for example, on the order of 1.5 V. After pulse 201, signal RST is set back to the high state, which causes the resetting of node SENSE to high power supply voltage $V_{RT}$.

Falling edge 202 of pulse 201 marks the beginning of the integration phase, or long integration period $T_1$. Acquisition node K being isolated from sense node SENSE (signal TG in the low state), the electric charges generated in photodiode 101 under the effect of light cause a progressive decrease of the voltage of acquisition node K.

At an intermediate time of integration phase T1, signal RST is set back to the low state to isolate sense node SENSE from high power supply rail $V_{RT}$, after which transfer signal TG is set to a high state during a second pulse 203, or skimming pulse, but at a voltage $V_{MTG}$ lower than voltage $V_{HTG}$ of pulse 201, for example, at a 1.4-V voltage. If, during pulse 203, the voltage at acquisition node K is at a level lower than $V_{MD}-V_{MTG}-V_{thTG}$, where $V_{thTG}$ is the threshold voltage of transistor 103, a current flows through transistor 103 during pulse 203, and the voltage of node K is taken back to $V_{MD}$. If, however, during pulse 203, the voltage at node K is higher than $V_{MD}$, no current flows through transistor 103, and the voltage at node K remains unchanged. After pulse 203, signal RST is set back to the high state, to reset node SENSE to high power supply voltage $V_{RT}$. In other words, if, during pulse 203, the amount of photogenerated charges stored in the photodiode since the beginning of integration phase $T_1$ exceeds a threshold, set by voltage $V_{MD}$, the excess charges above this threshold are transferred to node SENSE via transistor 103, and then drained off to rail $V_{RT}$ via transistor 105 (skimming).

Falling edge 204 of pulse 203 marks the beginning of a short integration period $T_2$, or integration sub-period, included in integration period $T_1$. During period $T_2$, the voltage across the photodiode keeps on decreasing proportionally to the amount of light received by the pixel. Before the end of period $T_2$, signal RST is set to the low state to isolate node SENSE from high power supply rail $V_{RT}$. The voltage at node SENSE is then read, as illustrated by arrow LREF of FIG. 2. To read the voltage at node SENSE, it is for example provided to turn on transistor 109, by setting signal READ to a high state, to transfer the voltage of node SENSE to output rail 110 via transistors 107 and 109. The voltage of pixel signal RS is then read from rail 110. Voltage $V_{LREF}$ read at step LREF is stored, and forms a reference for subsequent steps of measurement of the photodiode discharge level.

At the end of short integration period $T_2$, a third pulse 205, or first reading pulse, of same voltage level $V_{MTG}$ as pulse 203, is applied to signal TG. If, during pulse 205, the voltage at acquisition node K is at a level smaller than $V_{MD}$, a current flows through transistor 103 during pulse 205, thus taking the voltage at node K back to level $V_{MD}$. If, however, during pulse 205, the voltage at node K is higher than $V_{MD}$, no current flows through transistor 103, and the voltage at node K remains unchanged. In other words, during pulse 205, the photogenerated charges stored in the photodiode during short integration period $T_2$, above the threshold set by voltage $V_{MD}$, are transferred to node SENSE. The voltage at node SENSE decreases by a value proportional to the amount of transferred charges. Falling edge 206 of pulse 205 marks the end of short integration phase $T_2$. After the end of period $T_2$, the voltage at node SENSE is read, as illustrated by arrow L1 of FIG. 2.

After read step L1, a fourth pulse 207, or second read pulse, is applied to signal TG, at a voltage equal to voltage $V_{HTG}$ of pulse 201. In this example, node SENSE is not reset between pulses 205 and 207. Pulse 207 causes the transfer to sense node SENSE of all the photogenerated charges contained in photodiode 101. The voltage at node SENSE decreases by a value proportional to the amount of transferred charges. Falling edge 208 of pulse 207 marks the end of integration phase $T_1$. After the end of integration phase $T_1$, the voltage at node SENSE is read, as illustrated by arrow L2 of FIG. 2. The pixel is then reset for a new read cycle.

Figure 3A:
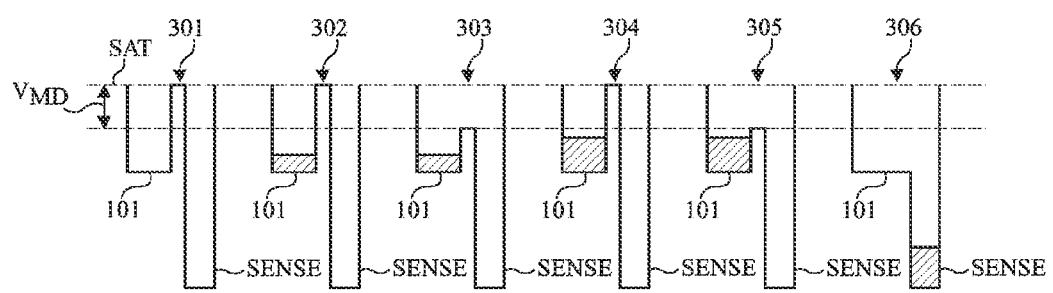
FIGS. 3A to 3C schematically illustrate charge transfers from a photodiode to a sense node of the pixel of FIG. 1, when this pixel is controlled according to the method of FIG. 2.
Figure 3B:
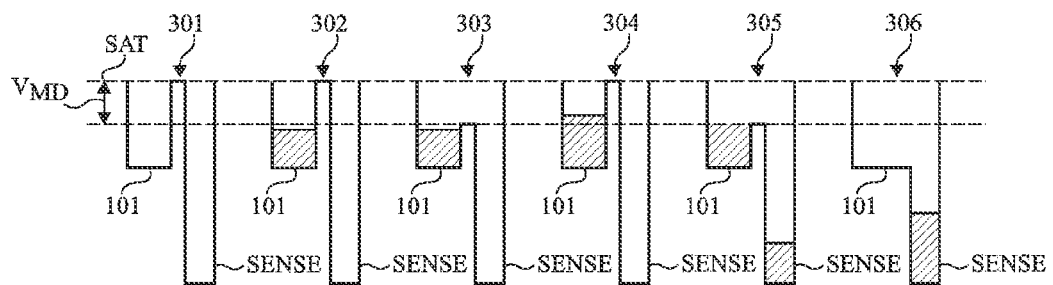
Figure 3C:
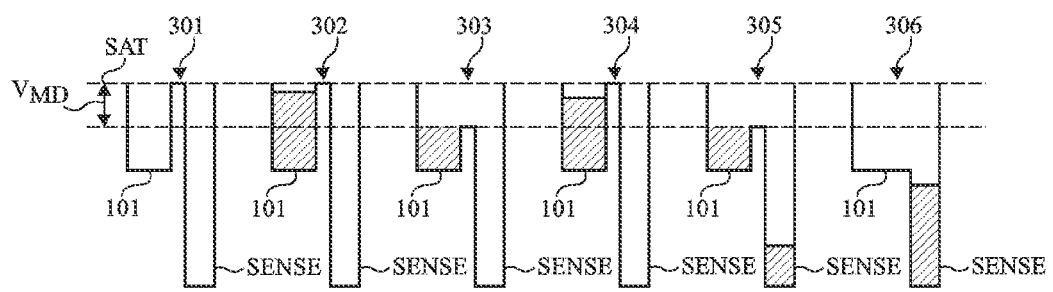

FIGS. 3A to 3C schematically illustrate charge transfers from acquisition node K to sense node SENSE of pixel 100 of FIG. 1, when the pixel is controlled according to the method of FIG. 2. FIGS. 3A, 3B, and 3C show the transfers respectively in the case of a low illumination, in the case of a medium illumination, and in the case of a strong illumination.

At a time 301 of beginning of integration phase $T_1$, for example, immediately after pulse 201, photodiode 101 and sense node SENSE still contain no photogenerated charges.

At an intermediate time 302 of integration phase $T_1$, for example, just before skimming pulse 203, photodiode 101 contains an amount of photogenerated charges proportional of the light intensity received by the pixel since the beginning of integration phase $T_1$.

At a time 303 following the setting back to the high state of signal RST after skimming pulse 203, the charges stored in the photodiode between the beginning of integration phase T₁ and falling edge 204 of pulse 203 above the threshold set by voltage V_{MD} have been drained off to high power supply rail V_{RT} (skimming). In the shown example, as respectively appears in FIGS. 3A, 3B, and 3C, during the skimming, no charge is drained off in the case of a low or medium illumination, and charges are drained off in the case of a strong illumination.

At a time 304 close to the end of integration sub-period T₂, for example, just before pulse 205, the charges photogenerated in the photodiode during integration sub-period T₂ add to the charges having remained in the photodiode after skimming by pulse 203.

At a time 305 just after the end of integration sub-period T₂, the charges stored in the photodiode during sub-period T₂, above the intermediate threshold set by voltage V_{MD}, have been transferred to node SENSE. In this example, as respectively appears in FIGS. 3A, 3B, and 3C, during pulse 205, no charge is transferred in the case of a low illumination, and charges are transferred in the case of a medium or strong illumination.

At a time 306 just after the end of integration phase T₁, all the charges remaining in the photodiode at the end of integration phase T₁ have been transferred onto node SENSE. Since node SENSE has not been reset after pulse 205, the charges transferred onto node SENSE during pulse 207 add to the charges transferred during pulse 205.

Calling $V_{L1}$ and $V_{L2}$ the voltages respectively read at steps L1 and L2 of the read cycle described in relation with FIGS. 2 and 3A to 3C, value $V_{LREF}-V_{L1}$ is representative of the amount of photogenerated charges stored in the photodiode during integration sub-period T₂, above the threshold set by voltage $V_{MD}$. Value $V_{LREF}-V_{L2}$ is representative of the total amount of photogenerated charges contained in the pixel at the end of integration phase T₁. At the end of the read cycle, the sensor provides, for pixel 100, a wide dynamic range pixel value WDR, taking into account values $V_{LREF}-V_{L1}$ and $V_{LREF}-V_{L2}$, for example, by applying the following formula:

$$WDR=MAX(V_{LREF}-V_{L2}, (V_{LREF}-V_{L1})\times(T_1/T_2))$$

where MAX(a, b) is a function providing the higher value between a and b.

The method described in relation with FIGS. 2 and 3A to 3C enables to improve the discrimination of luminosity levels, and accordingly to improve the sensitivity dynamics of the sensor with respect to control methods with a single integration period. Various alternative control methods with a double integration period have also been provided. As an example, in the method described in relation with FIG. 2, an additional step of resetting of sense node SENSE, followed by an additional reference voltage reading step, may be provided between pulses 205 and 207. Control methods with a double integration period however may all have the same disadvantage, that is, the dynamics improvement that they provide may remain insufficient for certain applications.

To further increase the sensitivity dynamics of a CMOS sensor, it could be devised to provide, on the same model as double integration period control methods of the above-described type, a triple integration period control method, where integration sub-period T₂ would itself contain an integration sub-period T₃, shorter than sub-period T₂, the output value of the pixel being determined by taking into account the amount of photogenerated charges stored in the photodiode during period T₃, above a second threshold lower than the threshold set by voltage $V_{MD}$. Similarly, it could be devised to provide a quadruple, quintuple, etc., integration period.

In practice, the implementation of read methods comprising more than one integration sub-period however raises implementation issues, especially due to the fact that at least three different high voltage levels have to be applied to the gate of transistor 103, and that amounts of charges which may sometimes be very small have to be measured, beyond thresholds conditioned by these levels.

FIG. 4 is a timing diagram illustrating the variation of signals for controlling pixel 100 of FIG. 1 according to an embodiment of a control method. More specifically, FIG. 4 illustrates the variation of control signals TG and RST applied to pixel 100 by control circuit 120 during a read cycle.

In this example, the pixel read cycle successively comprises two read sequences of the type described in relation with FIG. 2. These two sequences may differ from each other by the duration of their integration periods and sub-periods.

In the shown example, each of the read sequences comprises the same steps as in the example of FIG. 2. In FIG. 4, the pulses and falling edges of signal TG and the read steps bear the same references as in FIG. 2, adding to the reference numerals of FIG. 2 index a for the first sequence (that is, in this order, 201_a, 202_a, 203_a, 204_a, LREF_a, 205_a, 206_a, L1_a, 207_a, 208_a, L2_a) and index b for the second sequence (that is, in this order, 201_b, 202_b, 203_b, 204_b, LREF_b, 205_b, 206_b, L1_b, 207_b, 208_b, L2_b). In FIG. 4, the integration phase, or long integration period (reference T₁ of FIG. 2) of the first sequence bears reference $T_l$, the integration sub-period, or short integration period (reference T₂ of FIG. 2) of the first sequence bears reference $T_m$, the integration phase, or long integration period, of the second sequence bears reference $T_s$, and the integration sub-period, or short integration period, of the second sequence bears reference $T_{us}$. Between the two read sequences, node SENSE is reset. To achieve this, signal RST is set to the high state during a pulse 301 after falling edge 208_a of pulse 207_a and before the beginning of pulse 201_b.

The integration periods and sub-periods of the first and second sequences may be selected so that durations $T_l$, $T_m$, $T_s$, and $T_{us}$ are all different, and may fulfill relation $T_l>T_m>T_s>T_{us}$. As an example, durations $T_l$, $T_m$, $T_s$, and $T_{us}$ fulfill relation $T_l=G\times T_m=G^2\times T_s=G^3\times T_{us}$, where G is a number greater than 1, for example, between 2 and 32.

In an embodiment, at the end of the first read sequence, after step L2_a, a first wide dynamic range pixel value WDR_a is calculated, and at the end of the second read sequence, after step L2b, a second wide dynamic range pixel value WDR_b is calculated. As an example values WDR_a and WDR_b are calculated by respectively applying the following formulas:

$$WDR_a=MAX(V_{LREFa}-V_{L2a}, (V_{LREFa}-V_{L1a})\times(T_l/T_m))$$

and $$WDR_b=MAX(V_{LREFb}-V_{L2b}, (V_{LREFb}-V_{L1b})\times(T_s/T_{us}))$$

where $V_{LREFa}$, $V_{L1a}$, $V_{L2a}$, $V_{LREFb}$, $V_{L1b}$, and $V_{L2b}$ respectively designate the voltages read at steps LREF_a, L1_a, L2_a, L_{REFb}, L1_b, and L2_b.

At the end of the read cycle, for each pixel, two wide dynamic range pixel values WDR_a and WDR_b, successively obtained by two double integration period control sequences with different integration times are thus available. A final image is then reconstructed from values WDR_a and WDR_b, that is, for each pixel of the image, a final output value WDR_{final} of the pixel is reconstructed from values WDR_a or WDR_b. As an example, one of the two values WDR_a and WDR_b is selected as the final output value of the pixel. The selection between values $WDR_a$ and $WDR_b$ is for example performed based on the comparison of the useful signal-to-noise ratios of values $WDR_a$ and $WDR_b$, by for example selecting that of the two values which has the highest signal-to-noise ratio. As a variation, value $WDR_{final}$ is determined, for each pixel, according to the following formula:

$$WDR_{final}=MAX(WDR_a, WDR_b\times(T_f/T_m)\times(T_s/T_{us})).$$

More generally, to restore a final image based on values $WDR_a$ and $WDR_b$ of the pixels, any other method for constructing an image of wide dynamic range based on two images successively taken with different integration times may be used.

An advantage of the described embodiment is that it is sufficient to store the two intermediate values $WDR_a$ and $WDR_b$ to be subsequently able to reconstruct a final output value of the pixel, which enables to decrease the necessary amount of memory with respect to a convention reconstruction based on four samples. In practice, it is even possible to only store intermediate value $WDR_a$, while waiting for the acquisition of value $WDR_b$, and then, as soon as value $WDR_b$ is obtained, to directly determine the final output value of the pixel. This enables to significantly decrease the size of the storage memories necessary for the reconstruction of the final image taken by the sensor.

As a variation, it may be provided, instead of calculating values $WDR_a$ and $WDR_b$ and of determining the final output value of the pixel based on these two values, not to calculate these values and to directly determine, at the end of the read cycle, the final output value of the pixel based on four values $V_{LREFa}-V_{L1a}$, $V_{LREFa}-V_{L2a}$, $V_{LREFb}-V_{L1b}$, and $V_{LREFb}-V_{L2b}$ read at steps $L1_a$, $L2_a$, $L1_b$, and $L2_b$ of the read cycle.

An advantage of the embodiment described in relation with FIG. 4 is that it enables to obtain an image with a very large sensitivity dynamic range, by using, for the control of the pixel read circuits, already well-controlled steps of a double integration period control method.

In an embodiment circuit 120 simultaneously controls in the same way all the pixels of a same row of the sensor, and the read cycle of each row of the sensor is slightly offset with respect to the read cycle of the next row, so that pixel signals RS are provided by a single row at a time on output rails 110 of the sensor (rolling shutter control). At the end of the first read sequence of the read cycle of a row of the sensor, value $WDR_a$ of each pixel of the row may be stored in a temporary storage memory, after which the second read sequence of the read cycle may be applied to the row. At the end of the second read sequence, value $WDR_b$ of each pixel in the row may be calculated, and values $WDR_a$ of the row pixels may be read from the storage memory where they have previously been stored. A final output value of the pixel may then be calculated for each pixel in the row by taking values $WDR_a$ and $WDR_b$ into account. The memory area used to store values $WDR_a$ of the row can then be decreased, and reused to store values $WDR_a$ of the pixels of another row of the sensor.

In this embodiment calling At the time shift between the cycles of reading of two consecutive rows of the sensor, it is sufficient, for the processing of the signals of the sensor pixels, to have a temporary storage memory capable of containing values $WDR_a$ of the pixels of a number of rows substantially equal to $T_s/\Delta t$.

Specific embodiments of the present disclosure have been described. Various alterations, modifications, and improvements will readily occur to those skilled in the art.

In particular, the present disclosure is not limited to the specific above-described case where the read cycle of a sensor pixel comprises two successive read sequences. As a variation, the pixel read cycle may comprise a number of successive read sequences greater than two.

Further, the read sequences of the read cycle are not necessarily all double integration period read sequences. As a variation, the read cycle may comprise one or several single integration period read sequences, provided for at least one of the read sequences of the cycle to have a double integration period.

Further, the present disclosure is not limited to the specific case where the double integration period read sequence(s) strictly correspond to the example of read sequence described in relation with FIG. 2. It will be within the abilities of those skilled in the art to implement other known double integration period read sequences in the provided read cycle.

More generally, according to an aspect of the described embodiments, the pixel read cycle comprises at least two successive integration phases or periods, at least one of the phases comprising an integration sub-period. According to another aspect, the output value of the pixel is determined by taking into account the amounts of photogenerated charges contained in the pixel at the end of each integration period, and the amount of photogenerated charges stored in the photodiode beyond a threshold during each integration sub-period.

Further, the described embodiments are not limited to the sensor example described in relation with FIG. 1. More generally, the described embodiments may be adapted to any CMOS pixel comprising a photodiode capable of being connected to a sense node by a transfer transistor.

Such alterations, modifications, and improvements are intended to be part of this disclosure, and are intended to be within the spirit and the scope of the present disclosure. Accordingly, the foregoing description is by way of example only and is not intended to be limiting.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   determining an amount of photogenerated charges in a pixel at an end of a first integration period;
   determining an amount of photogenerated charges in the pixel at an end of a second integration period;
   determining an amount of photocharges in the pixel beyond a threshold at an end of an integration subperiod; and
   determining an output associated with the pixel based on the determined amount of photogenerated charges in the pixel at the end of the first integration period, the determined amount of photogenerated charges in the pixel at the end of the second integration period and the determined amount of photocharges in the pixel beyond the threshold at the end of the integration subperiod.

2. The method of claim 1, comprising:
   before the beginning of said integration sub-period, draining photogenerated charges stored in the photodiode beyond said threshold from the photodiode.

3. The method of claim 1 wherein each of said integration periods comprises at least one integration sub-period and the output associated with the pixel is based on the determined amount of photocharges in the pixel beyond a threshold at the end of each of the integration subperiods.

4. The method of claim 1 wherein at least one of said integration periods does not have an integration sub-period.

5. The method of claim 1, comprising:
   determining an intermediate output value of the pixel at the end of each integration period, wherein the output associated with the pixel is based on said intermediate values.

6. The method of claim 5, wherein, at the end of each integration period comprising an integration sub-period, said intermediate value is determined based on the amount of photogenerated charges contained in the pixel at the end of the integration period and the amount of photogenerated charges stored in the photodiode beyond a threshold during the integration sub-period.

7. The method of claim 1, comprising:
   determining an amount of photogenerated charges in the pixel at an end of a third integration period, wherein the determined output associated with the pixel is based on the determined amount of photogenerated charges in the pixel at the end of the third integration period.

8. The method of claim 1 wherein said integration periods and the sub-period have different durations.

9. The method of claim 3 wherein the integration subperiod of the first integration period has a longer duration that a duration of the second integration period.

10. A system, comprising:
    at least one pixel having a photodiode; and
    at least one processing device configured to:
    read an amount of photogenerated charges in a pixel at an end of a first integration period;
    read an amount of photogenerated charges in the pixel at an end of a second integration period;
    determine an amount of photocharges in the pixel beyond a threshold at an end of an integration subperiod; and
    determine an output associated with the pixel based on the amount of photogenerated charges in the pixel at the end of the first integration period, the amount of photogenerated charges in the pixel at the end of the second integration period and the amount of photocharges in the pixel beyond the threshold at the end of the integration subperiod.

11. The system of claim 10 wherein a pixel includes a read circuit having a transistor connecting a cathode of the photodiode of the pixel to a sense node of the pixel.

12. The system of claim 10 wherein before the beginning of said integration sub-period, the at least one processing devices are configured to cause the pixel to drain photogenerated charges stored in the photodiode beyond said threshold from the photodiode.

13. The system of claim 10 wherein each of said integration periods comprises at least one integration sub-period.

14. The system of claim 10 wherein the at least one processing device is configured to determine an intermediate output value of the pixel at the end of each integration period, wherein the output associated with the pixel is based on said intermediate output value.

15. The system of claim 14 wherein the at least one processing device is configured to, at the end of each integration period comprising an integration sub-period, determine said intermediate value based on the amount of photogenerated charges contained in the pixel at the end of the integration period and the amount of photogenerated charges stored in the photodiode beyond a threshold during the integration sub-period.

16. The system of claim 1 wherein said integration periods and the sub-period have different durations.

17. The system of claim 10 wherein the at least one pixel comprises a plurality of pixels of an image sensor.

18. A non-transitory computer-readable medium containing contents which cause at least one processing device to perform a method, the method comprising:
    determining an amount of photogenerated charges in a pixel at an end of a first integration period;
    determining an amount of photogenerated charges in the pixel at an end of a second integration period;
    determining an amount of photocharges in the pixel beyond a threshold at an end of an integration subperiod; and
    determining an output associated with the pixel based on the determined amount of photogenerated charges in the pixel at the end of the first integration period, the determined amount of photogenerated charges in the pixel at the end of the second integration period and the determined amount of photocharges in the pixel beyond the threshold at the end of the integration subperiod.

19. The non-transitory computer-readable medium of claim 18 wherein the method comprises:
    before the beginning of said integration sub-period, draining photogenerated charges stored in the photodiode beyond said threshold from the photodiode.

20. The non-transitory computer-readable medium of claim 18 wherein said integration periods and the sub-period have different durations.

* * * * *